United States Patent
Lee et al.

(10) Patent No.: US 7,882,074 B2
(45) Date of Patent: Feb. 1, 2011

(54) VIDEO CONTENTS RECORDING APPARATUS AND METHOD OF MANAGING DATA STORAGE MEDIUM INCLUDED THEREIN

(75) Inventors: Jung-won Lee, Ansan-si (KR); Kang-suk Lee, Seongnam-si (KR); Kang-wook Chun, Hwaseong-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 539 days.

(21) Appl. No.: 10/958,649

(22) Filed: Oct. 6, 2004

(65) Prior Publication Data

US 2005/0183123 A1 Aug. 18, 2005

(30) Foreign Application Priority Data

Jan. 28, 2004 (KR) .................. 10-2004-0005305

(51) Int. Cl.
*G06F 7/00* (2006.01)
(52) U.S. Cl. .................. 707/662; 725/39; 725/44; 725/46; 725/47
(58) Field of Classification Search .......... 707/662, 707/1; 725/39, 44, 46, 47
See application file for complete search history.

(56) References Cited

U.S. PATENT DOCUMENTS

| 6,067,107 A * | 5/2000 | Travaille et al. ............ 725/24 |
| 6,219,837 B1 * | 4/2001 | Yeo et al. .................. 725/38 |
| 2002/0083064 A1 * | 6/2002 | Davis et al. ............... 707/100 |
| 2002/0120925 A1 * | 8/2002 | Logan ....................... 725/9 |
| 2002/0138165 A1 * | 9/2002 | Lord et al. ................. 700/94 |
| 2002/0152278 A1 * | 10/2002 | Pontenzone et al. ....... 709/217 |
| 2002/0174430 A1 * | 11/2002 | Ellis et al. ................. 725/46 |

FOREIGN PATENT DOCUMENTS

| JP | 10-234007 | 9/1998 |
| JP | 11-127396 | 5/1999 |
| JP | 2000-138906 | 5/2000 |
| JP | 2001-101797 | 4/2001 |
| KR | 2001-0058363 | 7/2001 |
| KR | 1020020015285 A | 2/2002 |
| KR | 2003-0086802 | 11/2003 |

OTHER PUBLICATIONS

Chinese Office Action for corresponding Chinese Patent Application No. 200510002490X dated Aug. 3, 2007.
Abstract of Japanese Publication No. 2000-138906, published May 16, 2000.

(Continued)

*Primary Examiner*—Cheyne D Ly
(74) *Attorney, Agent, or Firm*—Staas & Halsey LLP

(57) ABSTRACT

A video contents recording apparatus and a method of managing a data storage medium include: a data storage medium in which a plurality of contents are recorded; and a controller displaying a list of contents to be deleted generated from the contents recorded in the data storage medium to a user via a display unit according to a predetermined delete priority and deleting contents selected by the user from the data storage medium with reference to the list. According to an embodiment of the present invention, a recording space of a data storage medium having limited data storage capacity may be efficiently managed by automatically deleting contents stored in the data storage medium according to a predetermined priority selected by a user or by providing a delete list for referring to when the user determines contents to be deleted.

22 Claims, 3 Drawing Sheets

OTHER PUBLICATIONS

Korean Notice of Patent Decision in Application No. 10-2004-0005305 dated Aug. 17, 2010.

Korean Office Action 10-2004-0005305 dated Feb. 18, 2010, issued in corresponding Korean Patent No. 10-2004-0005305.

* cited by examiner

FIG. 3

| PRIORITY | CRITERION |
|---|---|
| 1 | WHETHER STORED PROGRAM HAS BEEN VIEWED |
| 2 | WHETHER STORING DURATION HAS EXPIRED |
| 3 | IMPORTANCE OF STORED PROGRAM |
| 4 | DURATION REMAINING UNTIL DELETION |
| 5 | STORED DURATION |
| 6 | NUMBER OF REPRODUCTION TIMES |
| 7 | PROGRAM CAPACITY |

VIDEO CONTENTS RECORDING APPARATUS AND METHOD OF MANAGING DATA STORAGE MEDIUM INCLUDED THEREIN

CROSS-REFERENCE TO RELATED APPLICATION

This application claims the priority of Korean Patent Application No. 2004-5305, filed on Jan. 28, 2004, in the Korean Intellectual Property Office, the disclosure of which is incorporated herein in its entirety by reference.

BACKGROUND OF THE INVENTION

1. Field of the Invention

The present invention relates to management of a data storage medium, and more particularly, to a video contents recording apparatus and a method of managing a data storage medium included therein.

2. Description of the Related Art

Since the development of digital broadcasting, digital video recorders, which may record digital broadcasting programs, have been developed. A digital video recorder may store received broadcasting programs in a data storage medium, such as a hard disc, included in the digital video recorder and display the stored broadcasting programs to a user via a display unit by decoding the stored broadcasting programs according to user commands. Also, the digital video recorder may store a broadcasting program currently being received in the data storage medium while displaying the broadcasting program to a user via a display unit by decoding the broadcasting program.

However, the data storage capacity of the data storage medium included in the digital video recorder is limited. Therefore, to produce vacant space to record new data, deletion of data already stored in the data storage medium is required.

Conventional methods of deleting data stored in a data storage medium include a manual deletion method and an automatic deletion method. In the manual deletion method, data stored in a data storage medium is deleted by a user selecting the data to be deleted and issuing a deletion command. However, in a video recording apparatus supporting only the manual deletion method, all or part of a broadcasting program to be recorded may not be able to be recorded due to a shortage of data recording space when a planned recording is performed due to insufficient data recording space being available in the data storage medium.

In the automatic deletion method, a broadcasting program is automatically deleted after being stored for a predetermined period if a user sets the predetermined time before the broadcasting program is being recorded. However, if data such as a stored broadcasting program is deleted according to a fixed delete condition, it is difficult to take into account the changes in a user's requirements. For example, a program that a user had thought would only need to be stored for a short time when recorded may suddenly need to be stored for a long time.

Also, a conventional video recording apparatus cannot restore deleted data. Accordingly, even though the use of broadcasting programs which have been deleted may be necessary at later time, the data is unavailable.

SUMMARY OF THE INVENTION

An aspect of the present invention provides a method of efficiently managing a data storage medium included in a video contents recording apparatus having limited data storage capacity.

An aspect of the present invention also provides a video contents recording apparatus which may efficiently manage a data storage medium having limited data storage capacity.

According to an aspect of the present invention, a method of managing a data storage medium included in a video contents recording apparatus comprises displaying a list of contents to be deleted generated from a plurality of contents recorded in the data storage medium to a user via a display unit according to a predetermined delete priority; and deleting contents selected by the user from the data storage medium with reference to the list.

According to another aspect of the present invention, another method of managing a data storage medium included in a video contents recording apparatus comprises determining contents to be deleted with reference to a list of contents to be deleted generated from a plurality of contents recorded in the data storage medium according to a predetermined delete priority; and deleting the contents to be deleted from the data storage medium.

According to another aspect of the present invention, a video contents recording apparatus comprises: a data storage medium in which a plurality of contents are recorded; and a controller displaying a list of contents to be deleted generated from the contents recorded in the data storage medium to a user via a display unit according to a predetermined delete priority and deleting contents selected by the user from the data storage medium with reference to the list.

According to another aspect of the present invention, another video contents recording apparatus comprises: a data storage medium in which a plurality of contents are recorded; and a controller determining contents to be deleted with reference to a list of contents to be deleted generated from the contents recorded in the data storage medium according to a predetermined delete priority and deleting the contents to be deleted from the data storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a table showing priority for determining contents to be deleted according to an embodiment of the present invention.

DETAILED DESCRIPTION OF THE EMBODIMENTS

Figure 1:
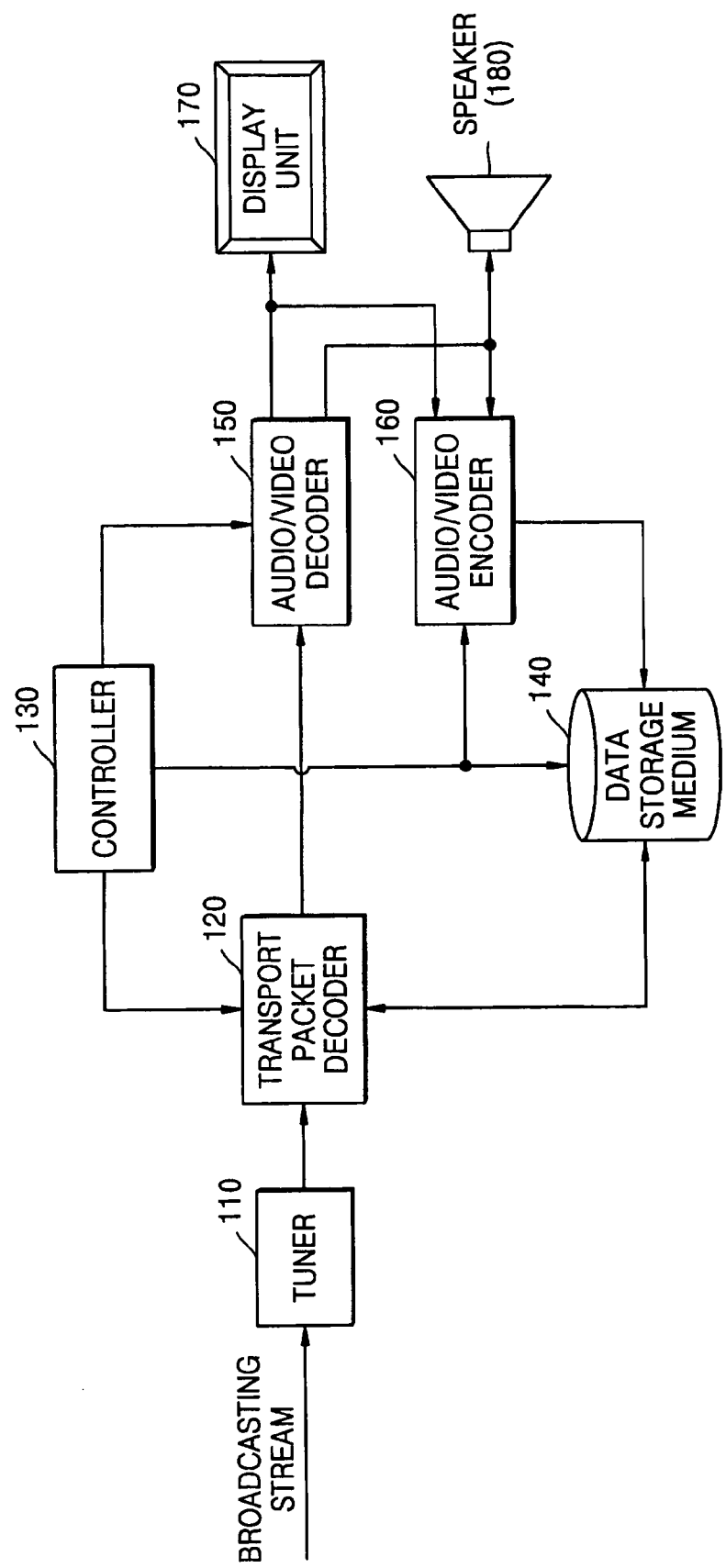
FIG. 1 is a block diagram of a video contents recording apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a video contents recording apparatus according to an embodiment of the present invention. In the present embodiment, the video contents recording and/or reproducing apparatus receives a digital broadcasting signal and reproduces the digital broadcasting signal to a user via a display unit 170 and/or stores the digital broadcasting signal in a data storage medium 140. Therefore, video contents stored in the data storage medium 140 are broadcasting programs. Also, a digital broadcasting signal in the present embodiment is a bitstream encoded according to an MPEG-2 standard. However, it is understood that other formats may be used, and that the programs may further be analog as well as, or in addition to, digital broadcasting signals.

Referring to FIG. 1, the video contents recording apparatus includes a tuner 110, a transport packet decoder 120, a controller 130, the data storage medium 140, a audio/video decoder 150, a audio/video encoder 160, the display unit 170, and a speaker 180.

The tuner 110 receives a broadcasting stream related to a digital broadcasting program which a user desires to view or store, and transmits the broadcasting stream to the transport packet decoder 120. When the broadcasting stream is encoded according to the MPEG-2 standard according to an aspect of the invention, a stream received by the tuner 110 is a transport stream (TS).

The transport packet decoder 120 packet-decodes a TS including a plurality of packets and transmits video or audio data compressed according to the MPEG-2 standard to the audio/video decoder 150.

The audio/video decoder 150 decodes the compressed video or audio data output from the transport packet decoder 120 according to the MPEG-2 standard, outputs a decoded video signal to the display unit 170, and outputs a decoded audio signal to the speaker 180.

The data storage medium 140 may be variously realized. For example, the data storage medium 140 may be an optical and/or magnetic information storage medium, such as a hard disc, a DVD and/or a next generation optical disc such as a Blu-ray or Advanced Optical Disc (AOD), or a high capacity memory.

Stream data received via the tuner 110 may be directly stored in the data storage medium 140. Also, the stream data received via the tuner 110 may be decoded by the audio/video decoder 150, encoded by the audio/video encoder 160, and stored in the data storage medium 140. However, if stream data received via the tuner 110 is an analog broadcasting signal, the received analog broadcasting signal is encoded and stored in the data. storage medium 140.

The controller 130 controls the entire operation of the video contents recording apparatus during management of the data storage medium 140.

In the present embodiment, a user issues commands to the video contents recording apparatus using an input unit such as a remote control (not shown). However, the input unit with which the user issues commands to the video contents recording apparatus is not limited to the remote control and may be variously realized according to conventional technology.

Based on the structure of the video contents recording apparatus according to an embodiment of the present invention as shown in FIG. 1, a method of managing the data storage medium 140 according to an embodiment of the present invention will now be described in detail. While not required, it is understood that the method may be implemented using computer software encoded on a computer readable medium for use with a general or special purpose computer.

Figure 2:
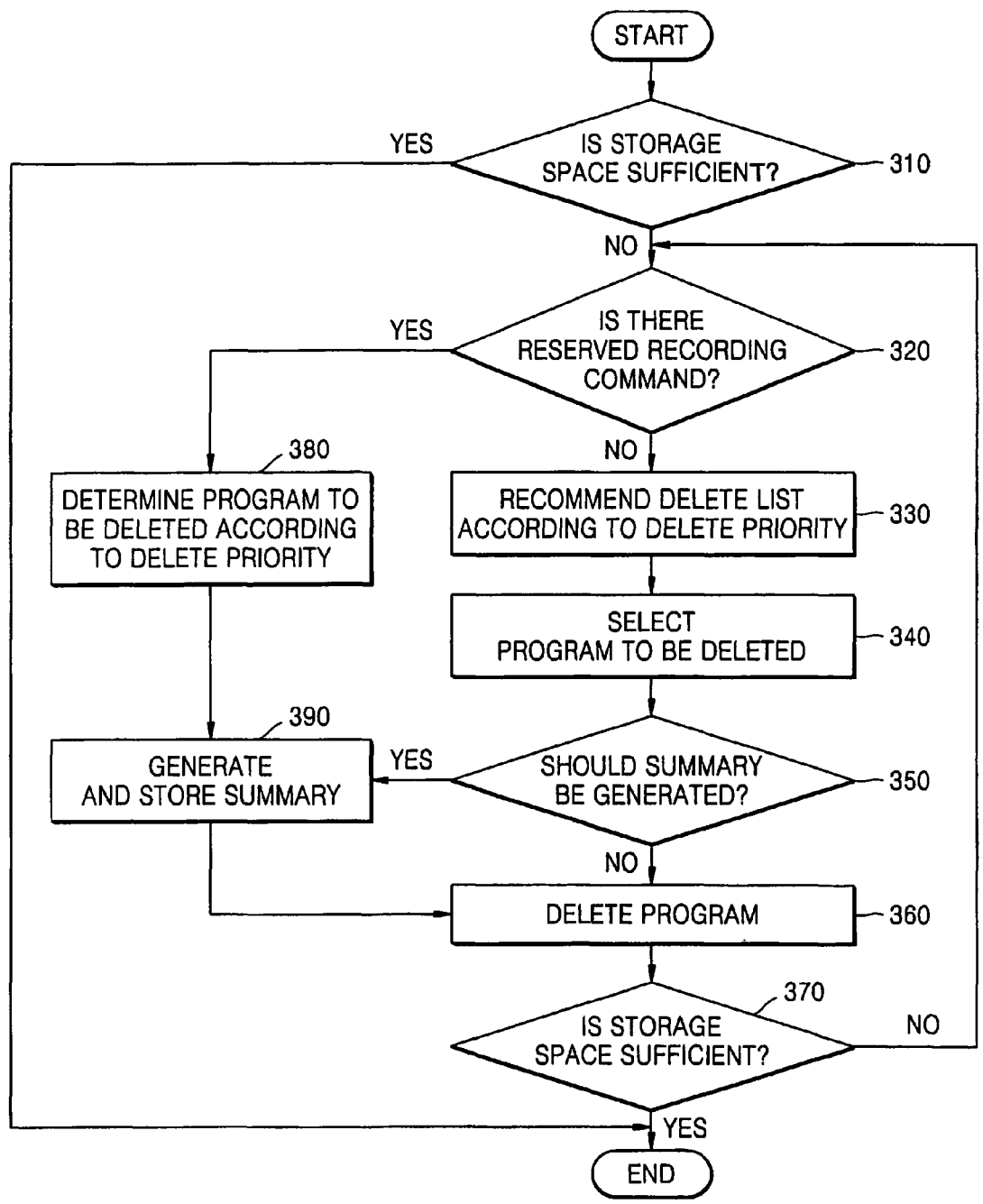
FIG. 2 is a flowchart illustrating a method of managing recording space of a data storage medium according to an embodiment of the present invention.

FIG. 2 is a flowchart illustrating a method of managing recording space of the data storage medium 140 according to an embodiment of the present invention. When the video contents recording apparatus, such as that shown in FIG. 1, is turned on, the controller 130 determines whether there is sufficient space to record new data in the data storage medium 140 in operation 310. The determination of whether there is sufficient space to record new data may be performed according to various standards. For example, the controller 130 may be programmed to determine that there is sufficient space to record new data if an amount of vacant space is larger than a predetermined standard value or if the vacant space is larger than a predetermined proportion of an entire recording capacity of the data storage medium 140.

If it is determined that there is not sufficient space to record new data in the data storage medium 140 in operation 310, the controller 130 determines whether there is a reserved recording command set by a user beforehand in operation 320. If it is determined that there is a reserved recording command in operation 320, the controller 130 cannot receive from the user a command to select a broadcasting program to be deleted. However, it is understood that, if the display unit 170 is on, it is possible that the user may be requested to select the program to be deleted.

If there is not a reserved recording command, the controller 130 recommends to the user via the display unit 170 a list of broadcasting program candidates to be deleted according to a predetermined delete priority in operation 330.

FIG. 3 is a table showing priority used to determine contents to be deleted according to an embodiment of the present invention. Referring to FIG. 3, the priority used to determine contents to be deleted is determined with reference to determination criteria such as whether a stored program has been viewed, whether a storing duration has expired, a level of importance of a program (including deletion prohibited), a duration remaining until deletion, a stored duration, a number of reproduction times, or a program size. These criteria used to determine programs to be deleted may change, be deleted, or be added according to user selection.

The controller 130 generates a list of programs to be deleted according to priority determination criteria determined by the user in advance. To generate the list of programs to be deleted, the controller 130 uses all or some of the priority determination criteria determined by the user in advance.

The list of programs to be deleted is generated from all broadcasting programs stored in the data storage medium 140.

The user selects at least one program to be deleted with reference to the list of programs to be deleted recommended to the user in operation 340.

After at least one program to be deleted is selected by the user, the controller 130 asks the user whether a summary of the program to be deleted should be generated and stored in operation 350.

The summary of the program is stored in the data storage medium 140 and may be prepared when the user needs to confirm or reuse a general essence of the deleted program after the program has been deleted. For example, the summary may be generated by storing only intra frames or decreasing a resolution of a video in a case of video data. Since data stored in a summary is less than the data of an original program, empty storage space of the data storage medium 140 may be increased, and the user may confirm or reuse the general essence of the deleted program after the program has been deleted.

If the controller 130 receives a command to generate the summary of the program to be deleted from the user in operation 350, the controller 130 generates the summary, stores the summary in the data storage medium 140 in operation 390 and deletes the program to be deleted in operation 360.

On the other hand, if it is determined that there is a reserved recording command in operation 320, the controller 130 automatically determines at least one broadcasting program to be deleted according to the predetermined delete priority as shown in FIG. 3 in operation 380. The controller 130 generates a summary of the program determined to be deleted, stores the summary in the data storage medium 140 in operation 390 and deletes the program to be deleted in operation 360.

After the program is deleted, the controller 130 determines again whether there is sufficient space to record new data in the data storage medium 140 in operation 370. The determination of whether there is sufficient space to record new data may be performed in the same manner as in operation 310. That is, the controller 130 may be programmed to determine that there is sufficient space to record new data if an amount of vacant space is larger than a predetermined standard value or if the vacant space is larger than a predetermined proportion of an entire recording capacity of the data storage medium 140.

If it is determined that there is not sufficient space to record new data in the data storage medium 140 in operation 370, operations 320 through 390 are repeated.

However, operations 320, 350, and 390 are not essential. That is, the controller 130 may perform operations 380 and 390 without determining whether there is a reserved recording command input beforehand. Also, the controller 130 may delete a program after generating a summary of the program without asking the user whether the summary of the program to be deleted should be generated and stored, or may delete the program without generating the summary.

The present invention may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Further, while described as being used for recording broadcast programs, it is understood that the method may be used for recording received data that is not broadcast (such as DVD or VHS tapes), and/or audio data recorded without video data, so as to allow management of a data library for contents received in addition to or instead of the broadcast contents.

As described above, according to an embodiment of the present invention, recording space of a data storage medium having limited data storage capacity may be efficiently managed by automatically deleting contents stored in the data storage medium according to a priority selected by a user or providing a delete list for referring to when the user determines contents to be deleted. In particular, the user may confirm or reuse the general essence of the deleted contents after the contents have been deleted by separately generating and storing a summary of the deleted contents.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of managing a data storage medium included in a video contents recording and/or reproducing apparatus, the method comprising:
   displaying a list of contents to be deleted generated from a plurality of contents recorded in the data storage medium to a user via a display unit according to a predetermined delete priority; and
   deleting contents selected by the user from the data storage medium with reference to the list,
   wherein the predetermined delete priority is set by a user in accordance with predetermined criteria,
   wherein the method further comprises determining whether there is sufficient space to record new data, and
   wherein the deleting of the contents further comprises:
   generating a summary of the contents to be deleted and storing the summary of the contents to be deleted in the data storage medium, wherein the summary is a brief version of the content to be deleted and data stored in the summary is less than data of an original program.

2. The method of claim 1, wherein the delete priority is determined by the user before recording the contents in the data storage medium by determining as a criterion for priority at least one of:
   whether the contents recorded in the data storage medium have been viewed;
   whether a storing duration of the contents has expired;
   a level of importance of the stored contents;
   a remaining storage duration;
   a stored duration;
   a number of reproduction times;
   a size of the contents; or
   a combination thereof.

3. The method of claim 1, wherein the storing of the summary of the content to be deleted is performed according to a predetermined preference of the user.

4. A method of managing a data storage medium included in a video contents recording apparatus, the method comprising:
   determining contents to be deleted with reference to a list of contents to be deleted generated from a plurality of contents recorded in the data storage medium according to a predetermined delete priority; and
   deleting the contents to be deleted from the data storage medium,
   wherein the predetermined delete priority is set by a user in accordance with predetermined criteria,
   wherein the method further comprises determining whether there is sufficient space to record new data, and
   wherein the deleting of the contents further comprises:
   generating a summary of the contents to be deleted and storing the summary of the contents to be deleted in the data storage medium, wherein the summary is a brief version of the content to be deleted and data stored in the summary is less than data of an original program.

5. The method of claim 4, wherein the delete priority is determined by the user before recording the contents in the data storage medium by determining as a criterion for priority at least one of:
   whether the contents recorded in the data storage medium have been viewed;
   whether a storing duration of the contents has expired;
   a level of importance of the stored contents;
   a remaining storage duration;
   a stored duration;
   a number of reproduction times
   a size of the contents; or
   a combination thereof.

6. A video contents recording and/or reproducing apparatus comprising:
   a data storage medium on which a plurality of contents are recorded; and
   a controller displaying a list of contents to be deleted which is generated from the contents recorded on the data storage medium to a user via a display unit according to a predetermined delete priority and deleting contents selected by the user from the data storage medium with reference to the list,
   wherein the predetermined delete priority is set by a user in accordance with predetermined criteria,
   wherein the controller further determines whether there is sufficient space to record new data, and
   wherein the controller generates a summary of the contents to be deleted and stores the summary of the contents to be deleted in the data storage medium, wherein the summary is a brief version of the content to be deleted and data stored in the summary is less than data of an original program.

7. The apparatus of claim 6, wherein the delete priority is determined by the user before recording the contents in the data storage medium by determining as a criterion of priority at least one of:
   whether the contents recorded in the data storage medium have been viewed;
   whether a storing duration of the contents has expired;
   a level of importance of the stored contents;
   a remaining storage duration;
   a stored duration;
   a number of reproduction times;
   a size of the contents; or
   a combination thereof.

8. The apparatus of claim 6, wherein the controller generates a summary of the contents to be deleted and stores the summary of the contents to be deleted in the data storage medium in response to a command to generate the summary input from the user.

9. A video contents recording and/or reproducing apparatus, comprising:
   a data storage medium on which a plurality of contents are recorded; and
   a controller determining contents to be deleted with reference to a list of contents to be deleted and which is generated from the contents recorded in the data storage medium according to a predetermined delete priority and deleting the contents to be deleted from the data storage medium,
   wherein the predetermined delete priority is set by a user in accordance with predetermined criteria,
   wherein the controller further determines whether there is sufficient space to record new data, and
   wherein the controller generates a summary of the contents to be deleted and stores the summary of the contents to be deleted in the data storage medium, wherein the summary is a brief version of the content to be deleted and data stored in the summary is less than data of an original program.

10. The apparatus of claim 9, wherein the delete priority is determined by the user before recording the contents in the data storage medium by determining as a criterion of priority at least one of:
    whether the contents recorded in the data storage medium have been viewed;
    whether a storing duration of the contents has expired;
    a level of importance of the stored contents;
    a remaining storage duration;
    a stored duration;
    a number of reproduction times;
    a size of the contents; or
    a combination thereof.

11. A computer readable medium having recorded thereon a computer readable program to perform a method of deleting recorded contents which is performed by a computer, the method comprising:
    displaying a list of contents to be deleted generated from a plurality of contents recorded in the data storage medium to a user via a display unit according to a predetermined delete priority;
    deleting contents selected by the user from the data storage medium with reference to the list; and
    determining whether there is sufficient space to record new data, wherein the predetermined delete priority is set by a user in accordance with predetermined criteria, and
    wherein the deleting of the contents further comprises:
    generating a summary of the contents to be deleted and storing the summary of the contents to be deleted in the data storage medium, wherein the summary is a brief version of the content to be deleted and data stored in the summary is less than data of an original program.

12. A computer readable medium having recorded thereon a computer readable program to perform a method of deleting recorded contents which is performed by a computer, the method comprising:
    determining contents to be deleted with reference to a list of contents to be deleted generated from a plurality of contents recorded in the data storage medium according to a predetermined delete priority;
    deleting the contents to be deleted from the data storage medium; and
    determining whether there is sufficient space to record new data,
    wherein the predetermined delete priority is set by a user in accordance with predetermined criteria, and
    wherein the deleting of the contents further comprises:
    generating a summary of the contents to be deleted and storing the summary of the contents to be deleted in the data storage medium, wherein the summary is a brief version of the content to be deleted and data stored in the summary is less than data of an original program.

13. A video contents recording and/or reproducing apparatus comprising:
    a data storage medium on which a plurality of contents are recorded;
    a display unit to display to a user a list of contents to be deleted, wherein the list of contents is generated from the contents recorded in the data storage medium according to a predetermined delete priority; and a controller to delete contents selected by the user from the data storage medium with reference to the displayed list, wherein the predetermined delete priority is set by a user in accordance with predetermined criteria, wherein the controller further determines whether there is sufficient space to record new data, and wherein the controller generates a summary of the contents to be deleted and stores the summary of the contents to be deleted in the data storage medium, wherein the summary is a brief version of the content to be deleted and data stored in the summary is less than data of an original program.

14. The apparatus of claim 13, wherein the delete priority is determined by the user before recording the contents in the data storage medium by determining as a criterion of priority at least one of:

whether the contents recorded in the data storage medium have been viewed;

whether a storing duration of the contents has expired;

a level of importance of the stored contents;

a remaining storage duration;

a stored duration;

a number of reproduction times;

a size of the contents; or a combination thereof.

15. The apparatus of claim 13, wherein the controller generates a summary of the contents to be deleted and stores the summary of the contents to be deleted in the data storage medium in response to a command to generate the summary input from the user.

16. A video contents recording and/or reproducing apparatus, comprising:

a data storage medium in which a plurality of contents are recorded;

a display unit to display reproduced contents from the data storage medium; and a controller to determine contents to be deleted from the contents recorded in the data storage medium according to a predetermined delete priority with reference to the list of contents to be deleted and to delete, manually and/or automatically, the contents to be deleted from the data storage medium, wherein the predetermined delete priority is set by a user in accordance with predetermined criteria, wherein the controller further determines whether there is sufficient space to record new data, and wherein the controller generates a summary of the contents to be deleted and stores the summary of the contents to be deleted in the data storage medium, wherein the summary is a brief version of the content to be deleted and data stored in the summary is less than data of an original program.

17. The apparatus of claim 16, wherein the delete priority is determined by the user before recording the contents in the data storage medium by determining as a criterion of priority at least one of:

whether the contents recorded in the data storage medium have been viewed;

whether a storing duration of the contents has expired;

a level of importance of the stored contents;

a remaining storage duration;

a stored duration;

a number of reproduction times;

a size of the contents; or a combination thereof.

18. The apparatus of claim 13, wherein the summary comprises video data with a reduced resolution and/or by storing only intraframes.

19. A computer readable medium having recorded thereon computer readable instructions to manage contents recorded on a data storage medium, wherein the instructions are performed by a computer, the instructions comprising:

generating a list of contents stored on the data storage medium to be deleted according to a predetermined delete priority; deleting contents in accordance with a selection by the user; and determining whether there is sufficient space to record new data, wherein the predetermined delete priority is set by a user in accordance with predetermined criteria, and wherein the deleting of the contents further comprises:

generating a summary of the contents to be deleted and storing the summary of the contents to be deleted in the data storage medium, wherein the summary is a brief version of the content to be deleted and data stored in the summary is less than data of an original program.

20. The method of claim 1, wherein the storing of the summary of the content to be deleted is performed in response to a command to generate the summary input from the user.

21. The method of claim 1, wherein the summary is generated by storing intra frames of the content to be deleted.

22. The method of claim 1, wherein the summary is generated by decreasing a resolution of the content to be deleted.

* * * * *

UNITED STATES PATENT AND TRADEMARK OFFICE
CERTIFICATE OF CORRECTION

PATENT NO. : 7,882,074 B2  Page 1 of 1
APPLICATION NO. : 10/958649
DATED : February 1, 2011
INVENTOR(S) : Jung-won Lee et al.

It is certified that error appears in the above-identified patent and that said Letters Patent is hereby corrected as shown below:

Column 7, Line 13, In Claim 5, after "times" insert --;--.

Signed and Sealed this
Twenty-sixth Day of April, 2011

David J. Kappos
*Director of the United States Patent and Trademark Office*